US008773824B2

(12) United States Patent
Sumi et al.

(10) Patent No.: US 8,773,824 B2
(45) **Date of Patent: *Jul. 8, 2014**

(54) ESD PROTECTION DEVICE AND MANUFACTURING METHOD THEREFOR

(75) Inventors: Takahiro Sumi, Nagaokakyo (JP); Eriko Sawada, Nagaokakyo (JP); Jun Adachi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 331 days.

This patent is subject to a terminal disclaimer.

(21) Appl. No.: 13/247,029

(22) Filed: Sep. 28, 2011

(65) Prior Publication Data

US 2012/0250196 A1 Oct. 4, 2012

(30) Foreign Application Priority Data

Sep. 29, 2010 (JP) ................................ 2010-218444

(51) Int. Cl.
*H02H 9/00* (2006.01)

(52) U.S. Cl.
USPC ........................................................... 361/56

(58) Field of Classification Search
USPC ........................................................... 361/56
See application file for complete search history.

(56) References Cited

U.S. PATENT DOCUMENTS

| | | | | |
|---|---|---|---|---|
| 8,514,536 | B2 * | 8/2013 | Sawada et al. | 361/56 |
| 2009/0067113 | A1 * | 3/2009 | Urakawa | 361/220 |
| 2010/0309595 | A1 | 12/2010 | Adachi et al. | |
| 2011/0222197 | A1 * | 9/2011 | Adachi et al. | 361/56 |

FOREIGN PATENT DOCUMENTS

| | | | |
|---|---|---|---|
| CN | 101542856 | A | 9/2009 |
| JP | 09-266053 | A | 10/1997 |
| JP | 2001-043954 | A | 2/2001 |
| JP | 2002-270457 | A | 9/2002 |
| JP | 4434314 | B2 | 3/2010 |
| WO | 2010/061550 | A1 | 6/2010 |

* cited by examiner

*Primary Examiner* — Jared Fureman
*Assistant Examiner* — Kevin J Comber
(74) *Attorney, Agent, or Firm* — Keating & Bennett, LLP

(57) ABSTRACT

An ESD protection device includes a ceramic base material including a glass component, a first opposed electrode on one side of the ceramic base material and a second opposed electrode on the other side of the ceramic base material, which are arranged so as to include ends that are opposed to each other on the surface of the ceramic base material, and a discharge auxiliary electrode disposed between the first and second opposed electrodes, which is connected to each of the first and second opposed electrodes, and arranged so as to provide a bridge from the first opposed electrode to the second opposed electrode, and a sealing layer to prevent the ingress of the glass component from the ceramic base material into the discharge auxiliary electrode is provided between the discharge auxiliary electrode and the ceramic base material.

10 Claims, 5 Drawing Sheets

ESD PROTECTION DEVICE AND MANUFACTURING METHOD THEREFOR

BACKGROUND OF THE INVENTION

1. Field of the Invention

The present invention relates to an ESD protection device to protect a semiconductor device or other electronic devices from electrostatic discharge failures and a method for manufacturing a ESD protection device.

2. Description of the Related Art

In recent years, in commercial-off-the-shelf appliances, there has been an increase in the frequency of inserting and removing cables as input-output interfaces, and static electricity is likely to be applied to input-output connector areas. In addition, miniaturization in design with an increase in signal frequency has made it difficult to create paths, and large-scale integration (LSI) itself has been fragile to static electricity.

Therefore, ESD protection devices have been used widely for protecting semiconductor devices, such as LSI devices, from electrostatic discharge (ESD).

As this type of ESD protection device, an ESD protection device (chip-type surge absorber) including an insulating chip body which includes an enclosed space with an inert gas encapsulated in the center, opposed electrodes which each has a microgap in the same plane, and external electrodes, and a method for manufacturing the ESD protection device have been proposed (see, for example, Japanese Patent Application Laid-Open No. 9-266053).

However, in the ESD protection device (chip-type surge absorber) in Japanese Patent Application Laid-Open No. 9-266053, electrons need to jump directly across the microgaps of the opposed electrodes without any assistance, and thus, the discharge capacity of the ESD protection device depends on the widths of the microgaps. Furthermore, as the microgaps are narrowed, the capacity as a surge absorber is increased. However, the width of a gap is limited by the formation of opposed electrodes using a printing method as described in Japanese Patent Application Laid-Open No. 9-266053, and an excessively narrow gap results in problems, such as the opposed electrodes connected to each other to cause a short circuit.

In addition, as described in Japanese Patent Application Laid-Open No. 9-266053, a hollow section is provided by stacking perforated sheets. Thus, considering that there is a need to provide a microgap in the hollow section, the reduction in size of the product also is limited in terms of stacking accuracy. Furthermore, in order to provide the enclosed space filled with an encapsulating gas, there is a need to perform stacking and pressure bonding under the encapsulating gas for stacking, thus leading to the problems of a complicated manufacturing process, a decrease in productivity, and an increase cost.

Furthermore, as another ESD protection device, an ESD protection device (surge absorbing element) provided with internal electrodes electrically connected to a pair of electrodes and a discharge space within an insulating ceramic layer including the external electrodes, and with a discharge gas trapped in the discharge space, and a method for manufacturing the ESD protection device have been proposed (see, for example, Japanese Patent Application Laid-Open No. 2001-43954).

However, the ESD protection device in Japanese Patent Application Laid-Open No. 2001-43954 also has the same problems as in the case of the ESD protection device in Japanese Patent Application Laid-Open No. 9-266053.

In addition, as yet another ESD protection device, an ESD protection device including a ceramic multilayer substrate, at least a pair of discharge electrodes provided in the ceramic multilayer substrate and opposed to each other with a predetermined distance provided therebetween, and external electrodes provided on the surface of the ceramic multilayer substrate and connected to the discharge electrodes has been proposed in which a region for connecting the pair of discharge electrodes includes an auxiliary electrode obtained by dispersing a conductive material coated with a nonconductive inorganic material (see, for example, Japanese Patent No. 4434314).

However, this ESD protection device has a problem in that a glass component in the ceramic multilayer substrate penetrates into the discharge auxiliary electrode to make the conductive material of the discharge auxiliary electrode excessively sintered during a firing step for the manufacture of the ESD protection device, thereby causing a short circuit defect.

SUMMARY OF THE INVENTION

To overcome the problems described above, preferred embodiments of the present invention provide an ESD protection device which has excellent discharge capacity, causes fewer short circuit defects, requires no special step for manufacture, and has excellent productivity, and also provide a method for manufacturing the ESD protection device.

An ESD protection device according to a preferred embodiment of the present invention preferably includes a ceramic base material including a glass component, a first opposed electrode on one side of the ceramic base material and a second opposed electrode on the other side of the ceramic base material, the first and second opposed electrodes being arranged so as to have their ends opposed to each other and spaced apart from one another at a distance therebetween on the surface of the ceramic base material, and a discharge auxiliary electrode connected to each of the first and second opposed electrodes, the discharge auxiliary electrode is arranged so as to provide a bridge from the first opposed electrode to the second opposed electrode, wherein a sealing layer to prevent ingress of the glass component from the ceramic base material into the discharge auxiliary electrode is provided between the discharge auxiliary electrode and the ceramic base material.

In addition, in the ESD protection device according to a preferred embodiment of the present invention, a reactive layer including a reaction product produced by a reaction between a component material of the sealing layer and a component material of the ceramic base material is preferably provided at the interface between the sealing layer and the ceramic base material.

In the ESD protection device according to a preferred embodiment of the present invention, the difference $\Delta B$ ($=B1-B2$) is preferably about 1.4 or less, for example, between basicity B1 of a main component material of the sealing layer and basicity B2 of an amorphous portion of the ceramic base material.

In addition, the sealing layer preferably includes at least some of the elements included in the ceramic base material.

The sealing layer preferably includes an aluminum oxide, for example, as its main component.

The discharge auxiliary electrode preferably includes a metallic particle and a ceramic component, for example.

Furthermore, a method for manufacturing an ESD protection device according to another preferred embodiment of the present invention preferably includes the steps of printing a sealing layer paste on one principal surface of a first ceramic green sheet, thereby forming an unfired sealing layer, printing a discharge auxiliary electrode paste to coat at least a portion of the sealing layer, thereby forming an unfired discharge auxiliary electrode, printing an opposed electrode paste on one principal surface of the first ceramic green sheet, thereby forming an unfired first opposed electrode on one side of the first ceramic green sheet and a second opposed electrode on the other side of the first ceramic green sheet, each of the first and second opposed electrodes partially covering the discharge auxiliary electrode, and the first and second opposed electrodes being spaced apart from one another at a distance therebetween, stacking a second ceramic green sheet on the other principal surface of the first ceramic green sheet, thereby forming an unfired laminated body, and firing the laminated body.

The ESD protection device according to a preferred embodiment of the present invention preferably includes on the surface of the ceramic base material, the first opposed electrode on one side of the ceramic base material and the second opposed electrode on the other side of the ceramic base material, which are arranged so as to have their ends opposed to each other and spaced apart from each other at a distance therebetween, the discharge auxiliary electrode connected to each of the first and second opposed electrodes, which is arranged so as to provide a bridge from the first opposed electrode to the second opposed electrode, wherein the sealing layer to prevent the ingress of the glass component from the ceramic base material into the discharge auxiliary electrode is provided between the discharge auxiliary electrode and the ceramic base material. Thus, the ingress of the glass component from the ceramic base material including the glass component is prevented and short circuit defects are prevented from being caused by excessive sintering of the discharge auxiliary electrode section.

Further, the sealing layer interposed between the ceramic base material and the connections between the opposed electrodes and the discharge auxiliary electrode enables the prevention of the ingress of the glass component through the opposed electrodes into the discharge auxiliary electrode.

In addition, by providing the reactive layer including a reaction product produced by the reaction between the component material of the sealing layer and the component material of the ceramic base material at the interface between the sealing layer and the ceramic base material, a highly reliable product with the sealing layer attached firmly to the ceramic material included in the ceramic base material is provided even when firing for the product is performed at a temperature lower than the melting point of the main component of the sealing layer.

Furthermore, by providing an ESD protection device that is configured so that the difference $\Delta B$ (=B1−B2) is about 1.4 or less, for example, between the basicity B1 of the main component material of the sealing layer and the basicity B2 of the amorphous portion of the ceramic base material, an excessive reaction or a poor reaction between the sealing layer and the ceramic base material is prevented so as to provide a high-reliability ESD protection device including a reactive layer which does not interfere with the function as an ESD protection device.

In addition, the sealing layer including an element included in the ceramic base material prevents an excessive reaction between the sealing section and the ceramic base material, thereby making it possible to provide an ESD protection device which has favorable characteristics.

When the sealing layer includes an aluminum oxide, for example, as its main component, the junction between the sealing section and the ceramic base material does not suffer from an excessive/poor reaction between the two, and enables the ingress of glass from the ceramic base material to be reliably blocked in the sealing layer, thus making it possible to prevent short circuit defects caused by the ingress of the glass component into the discharge auxiliary electrode, which causes sintering of the discharge auxiliary electrode.

When the discharge auxiliary electrode includes metallic particles and a ceramic component, the ceramic component interposed between the metallic particles increases the distance between the metallic particles, thus reducing sintering of the discharge auxiliary electrode in the step of forming the discharge auxiliary electrode by firing the discharge auxiliary electrode paste, and making it possible to prevent short circuit defects caused by excessive sintering of the discharge auxiliary electrode. In addition, the ceramic component prevents an excessive reaction with the sealing layer.

Furthermore, the method for manufacturing an ESD protection device according to a preferred embodiment of the present invention preferably includes the steps of printing a sealing layer paste on a first ceramic green sheet, thereby forming an unfired sealing layer, printing a discharge auxiliary electrode paste to coat a portion of the sealing layer, thereby forming an unfired discharge auxiliary electrode, printing an opposed electrode paste, thereby forming unfired opposed electrodes provided with an opposed electrode on one side and an opposed electrode on the other side, the opposed electrodes each partially covering the discharge auxiliary electrode, and the opposed electrodes being spaced apart from one another with a distance therebetween, stacking a second ceramic green sheet on one principal surface of the first ceramic green sheet, thereby forming an unfired laminated body, and firing the laminated body, and the respective steps are general-purpose steps used widely in the manufacturing processes of normal ceramic electronic components. Thus, the method is excellent for mass production. In addition, the sealing layer formed between the ceramic base material and the discharge auxiliary electrode isolates the discharge auxiliary electrode from the ceramic constituting the ceramic base material, thus making it possible to reliably prevent short circuit defects from being caused by excessive sintering of the discharge auxiliary electrode due to the ingress of the glass component, and to thereby ensure a stable discharge capacity.

Further, in the method for manufacturing an ESD protection device according to a preferred embodiment of the present invention, it is also possible to produce an ESD protection device including external electrodes through single firing such that an external electrode paste is printed on the surface of the unfired laminated body so as to be connected to the opposed electrodes, and then subjected to firing before the step of firing the laminated body, and it is also possible to form external electrodes such that an external electrode paste is printed on the surface of the laminated body, and then subjected to firing after firing the laminated body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
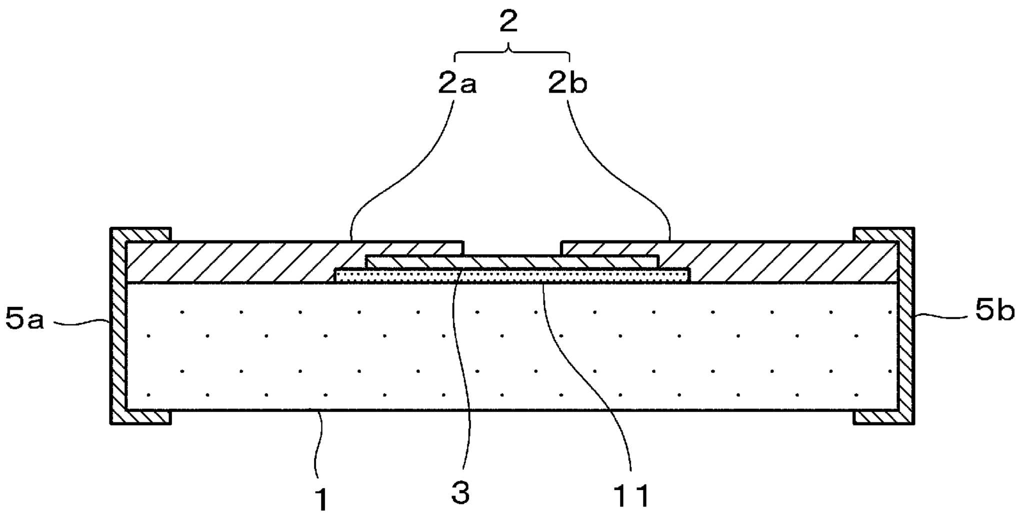
FIG. 1 is a front cross-sectional view schematically illustrating an ESD protection device according to a preferred embodiment of the present invention.
Figure 2:
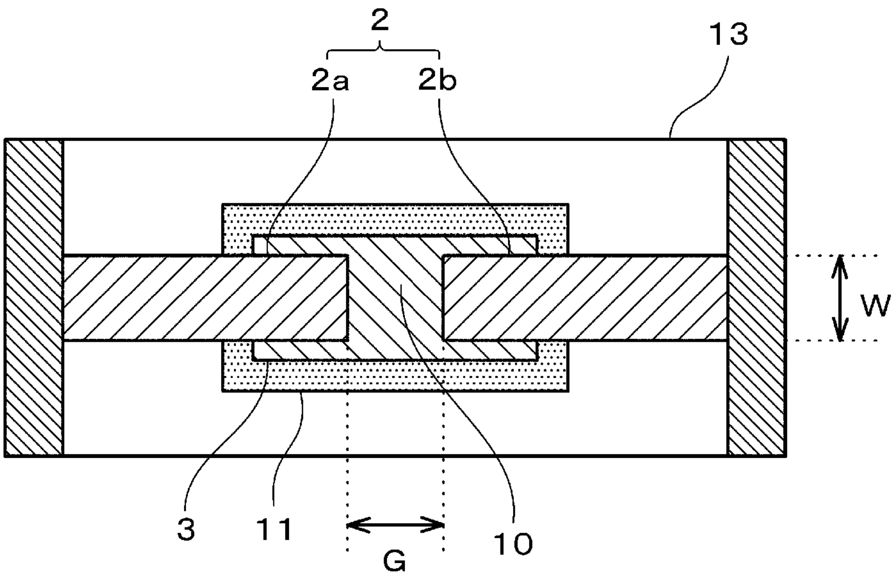
FIG. 2 is a plan view illustrating the ESD protection device according to the preferred embodiment of the present invention shown in FIG. 1.

FIG. 1 is a cross-sectional view schematically illustrating the structure of an ESD protection device according to a preferred embodiment of the present invention, and FIG. 2 is a plan view of the ESD protection device according to this preferred embodiment.

The ESD protection device, as shown in FIGS. 1 and 2, preferably includes a ceramic base material 1 including a glass component, opposed electrodes 2 including an opposed electrode 2*a* on one side and an opposed electrode 2*b* on the other side, which are provided on the surface of the ceramic base material 1, and include ends that are opposed to each other, a discharge auxiliary electrode 3 in partial contact with the opposed electrode 2*a* on one side and the opposed electrode 2*b* on the other side, which is arranged so as to provide a bridge from the opposed electrode 2*a* on the one side to the opposed electrode 2*b* on the other side, and external electrodes 5*a* and 5*b* arranged to make external electrical connections, which are disposed on both ends of the ceramic base material 1 so as to provide electrical conduction to the opposed electrode 2*a* and the opposed electrode 2*b*.

The discharge auxiliary electrode 3 preferably includes metallic particles and a ceramic component, for example, which is configured to reduce excessive sintering of the discharge auxiliary electrode 3, thereby making it possible to prevent short circuit detects from being caused by excessive sintering.

As the metallic particles, copper particles, and preferably, a copper powder with a surface coated with an inorganic oxide or a ceramic component may be used, for example. In addition, while the ceramic component is not particularly limited, the ceramic components preferably include, as an example, a ceramic component including the material of the ceramic base material (in this case, a Ba—Si—Al based material, for example), or a ceramic component including a semiconductor component, such as SiC, for example.

Furthermore, in the ESD protection device, a sealing layer 11 is preferably disposed between the discharge auxiliary electrode 3 and the ceramic base material 1.

The sealing layer 11 is preferably a porous layer composed of, for example, ceramic grains such as alumina, which function to absorb and trap the glass component included in the ceramic base material 1 and the glass component produced in the ceramic base material 1 in a firing step so as to prevent the ingress of the glass component into the discharge auxiliary electrode 3, thereby preventing short circuit detects from being caused by excessive sintering of the discharge auxiliary electrode section.

It is to be noted that the ESD protection device according to this preferred embodiment preferably includes the sealing layer 11 disposed over a wide range so as to be interposed not only between the discharge auxiliary electrode 3 and the ceramic base material 1, but also between the ceramic base material 1 and connections between the opposed electrodes 2 and the discharge auxiliary electrode 3, and the ESD protection device is thus configured so that the ingress of the glass component into the connections is effectively prevented.

A method for manufacturing an ESD protection device which has the structure as described above will be described below.

(1) Preparation of Ceramic Green Sheet

Materials preferably including Ba, Al, and Si, for example as main constituents are prepared as ceramic materials for the material of the ceramic base material 1.

Then, the respective materials are blended to provide a predetermined composition, and subjected to calcination at about 800° C. to about 1000° C., for example. The calcined powder obtained is subjected to grinding in a zirconia ball mill for about 12 hours to obtain a ceramic powder.

This ceramic powder with an organic solvent, such as toluene or ekinen, for example added is mixed, followed by the further addition and mixing of a binder and a plasticizer, thereby preparing a slurry.

This slurry is formed by a doctor blade method, for example, into a ceramic green sheet having a thickness of about 50 μm, for example.

(2) Preparation of Opposed Electrode Paste

In addition, as an opposed electrode paste for forming the pair of opposed electrodes 2*a* and 2*b*, preferably, a binder resin including about 80 weight % of Cu powder with an average particle size of approximately 2 μm, ethyl cellulose, and other components, for example, is prepared, and agitated and mixed with the use of a three roll mill with the addition of a solvent to prepare an opposed electrode paste. It is to be noted that the average particle size of the Cu powder mentioned above refers to a median particle size (D50) obtained from particle size distribution measurement by Microtrack.

(3) Preparation of Discharge Auxiliary Electrode Paste

Furthermore, as a discharge auxiliary electrode paste for forming the discharge auxiliary electrode 3, preferably, a Cu powder with a surface coated with about 5 weight % of aluminum oxide and with an average particle size of approximately 3 μm, a silicon carbide powder with an average particle size of approximately 0.5 μm, and an organic vehicle including ethyl cellulose and terpineol, for example, are blended, and agitated and mixed with the use of a three roll mill to prepare a discharge auxiliary electrode paste.

It is to be noted that the mixture ratio of the Cu powder to the silicon carbide powder was adjusted to be about 80/20 in terms of volume ratio.

(4) Preparation of Sealing Layer Paste Used for Forming Sealing Layer

In this example, multiple types of pastes each including an inorganic oxide and an organic vehicle were prepared as sealing layer pastes.

It is to be noted that it is preferable in preferred embodiments of the present invention to use a sealing layer paste which has a difference ΔB (=B1−B2) of about 1.4 or less, for example, between the basicity B1 of the sealing layer paste as a main component material and the basicity B2 of an amorphous portion of the ceramic base material, and in this example, inorganic oxides M1 to M10 were used as the main component of the sealing layer paste (sealing layer main component) as shown in Table 1.

In addition, as the organic vehicle, an organic vehicle OV1 was used in which resins P1 and P2 shown in Table 2 and a solvent (for example, terpineol) were blended at the ratio as shown in Table 3.

TABLE 1

| Sample Number | Sealing Layer Main Component | B value | ΔB value | Melting Point |
|---|---|---|---|---|
| M1 | BaO | 1.443 | 1.33 | 1923 |
| M2 | CaO | 1.000 | 0.89 | 2572 |
| M3 | $Al_2O_3$ | 0.191 | 0.08 | 2054 |
| M4 | $Nb_2O_5$ | 0.022 | −0.09 | 1520 |
| M5 | $TiO_2$ | 0.125 | 0.02 | 1855 |
| M6 | $ZrO_2$ | 0.183 | 0.07 | 2715 |
| M7 | $CeO_2$ | 0.255 | 0.15 | 340 |
| M8 | MgO | 0.638 | 0.53 | 2800 |
| M9 | ZnO | 0.721 | 0.61 | 1975 |
| M10 | SrO | 1.157 | 1.05 | 2430 |

TABLE 2

| Sample Number | Resin Type | Weight Average Molecular Weight |
|---|---|---|
| P1 | Ethocel Resin | $5 \times 10^4$ |
| P2 | Alkyd Resin | $8 \times 10^3$ |

TABLE 3

| | Resin | | Solvent |
|---|---|---|---|
| Sample Number | P1 | P2 | Terpineol |
| OV1 | 9 | 4.5 | 86.5 |

However, the main component of the sealing layer, the method for manufacturing the sealing layer component, etc. are not particularly limited. For example, the grain size of M3 ($Al_2O_3$) in Table 1 was varied within the range of D50=about 0.2 μm to about 2.5 μm to evaluate the characteristics, and it was confirmed that the characteristics are not affected. In addition, it was confirmed that the characteristics are also not affected in the evaluation of using varying M3 in regard to the manufacturing method. It is to be noted that the sealing layer main component was used on the order of D50=about 0.4 μm to about 0.6 μm in this example.

Basicity B (B1, B2>

The basicity (B1, B2) of an oxide melt can be classified broadly into an average oxygen ionic activity (conceptual basicity) obtained by calculation from the composition of the system in question, or an oxygen ionic activity (action point basicity) obtained by measurement of a response to externally provided stimulation such as a chemical reaction (redox potential measurement, optical spectrum measurement, etc.).

It is preferable to use the conceptual basicity in the case of using the basicity for research on the nature or structure of, or as a compositional parameter of an oxide melt. On the other hand, various phenomena involving an oxide melt are organized by the action point basicity in a more suitable manner. The basicity described in the present application refers to the former conceptual basicity.

More specifically, the Mi—O bonding strength of the oxide (inorganic oxide) MiO can be expressed by the attraction between the cation and the oxygen ion, which is represented by the following formula (1).

$$A_i = Z_i \cdot Zo^{2-}/(ri+ro^{2-})^2 = 2Z_i/(r_i+1.4)^2 \quad (1)$$

$A_i$: cation-oxygen ion attraction, $Z_i$: valence of i component cation, $r_i$: radius of i component cation (Å)

The oxygen donation ability of the single component oxide MiO is provided by the reciprocal of Ai, and thus satisfies the following formula (2).

$$Bi^0 \equiv 1/A_i \quad (2)$$

Now, in order to deal with the oxygen donation ability ideologically and quantitatively, the obtained $Bi^0$ value is converted into an indicator.

The $B_i^0$ value obtained above from the formula (2) is substituted into the following formula (3) to recalculate the basicity, thereby making it possible to deal with the basicity quantitatively for all of the oxides.

$$B_i = (B_i^0 - B_{SiO2}^0)/(B_{CaO}^0 - B_{SiO2}^0) \quad (3)$$

It is to be noted that when the $B_i^0$ value is converted into an indicator, the Bi value of CaO and the $B_i$ value of $SiO_2$ are respectively defined as 1.000 ($B_i^0$=1.43) and 0.000 ($B_i^0$=0.41).

The respective inorganic oxides M1 to M10 shown in Table 1 and the organic vehicle OV1 of composition as shown in Table 3 were blended at ratios as shown in Table 4, and kneaded and dispersed with the use of a three roll mill or other suitable device to prepare sealing layer pastes P1 to P10 as shown in Table 4.

TABLE 4

| Sample | Component of Sealing Layer (volume %) | | | | | | | | | | Organic Vehicle |
|---|---|---|---|---|---|---|---|---|---|---|---|
| Number | M1 | M2 | M3 | M4 | M5 | M6 | M7 | M8 | M9 | M10 | OV |
| P1 | 18.8 | — | — | — | — | — | — | — | — | — | 81.2 |
| P2 | — | 18.8 | — | — | — | — | — | — | — | — | 81.2 |
| P3 | — | — | 18.8 | — | — | — | — | — | — | — | 81.2 |
| P4 | — | — | — | 18.8 | — | — | — | — | — | — | 81.2 |
| P5 | — | — | — | — | 18.8 | — | — | — | — | — | 81.2 |
| P6 | — | — | — | — | — | 18.8 | — | — | — | — | 81.2 |
| P7 | — | — | — | — | — | — | 18.8 | — | — | — | 81.2 |
| P8 | — | — | — | — | — | — | — | 18.8 | — | — | 81.2 |
| P9 | — | — | — | — | — | — | — | — | 18.8 | — | 81.2 |
| P10 | — | — | — | — | — | — | — | — | — | 18.8 | 81.2 |

(5) Printing of Each Paste

Figure 3:
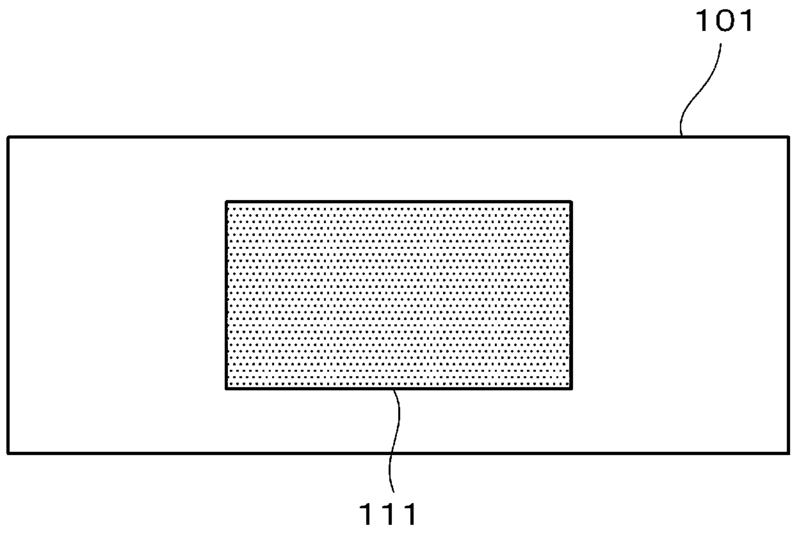
FIG. 3 is a diagram explaining a method for manufacturing an ESD protection device according to a preferred embodiment of the present invention, and a diagram illustrating the step of applying a sealing layer paste onto a first ceramic green sheet to form an unfired sealing layer.

First, as shown in FIG. 3, the sealing layer paste is applied onto the first ceramic green sheet 101 to form the unfired sealing layer 111.

Figure 4:
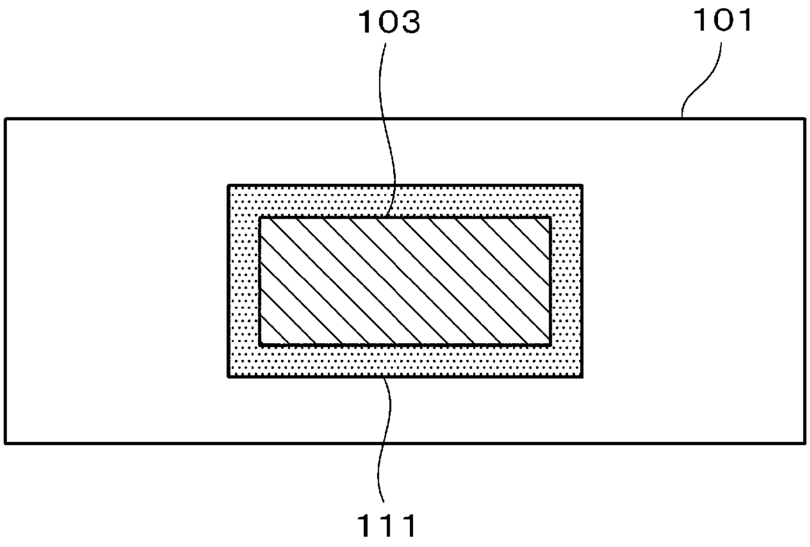
FIG. 4 is a diagram explaining the method for manufacturing an ESD protection device according to a preferred embodiment of the present invention, and a diagram illustrating the step of applying a discharge auxiliary electrode paste onto the unfired sealing layer to form an unfired discharge auxiliary electrode.

Then, as shown in FIG. 4, the discharge auxiliary electrode paste is printed on the unfired sealing layer 111 by a screen printing method, for example, so as to provide a predetermined pattern, thereby forming the unfired discharge auxiliary electrode 103.

Figure 5:
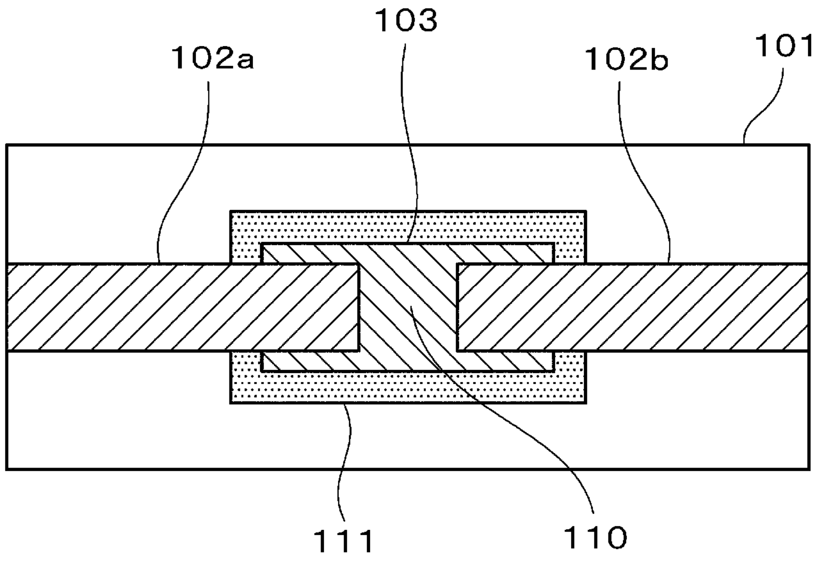
FIG. 5 is a diagram explaining the method for manufacturing an ESD protection device according to a preferred embodiment of the present invention, and a diagram illustrating the step of applying an opposed electrode paste to form unfired opposed electrodes on one and the other sides.

Furthermore, as shown in FIG. 5, the opposed electrode paste is applied to form the unfired opposed electrodes 102*a* and 102*b* on opposed sides to define the opposed electrodes 2 (see FIGS. 1 and 2) after firing. Thus, a gap section 110 corresponding to a discharge gap section 10 (FIGS. 1 and 2) is formed between the ends of the unfired opposed electrodes 102*a* and 102*b*, which are opposed to each other.

It is to be noted that, in the present preferred embodiment, the width W of the opposed electrodes 2*a* and 2*b* and the dimension G of the discharge gap 10 were respectively adjusted to be about 100 μm and about 30 μm, for example, after firing.

It is to be noted that the respective pastes, including the sealing layer paste, may be applied directly onto an object onto which the pastes are to be applied, or may be applied by other methods, such as a transfer method, for example.

In addition, the order of applying the respective pastes and the specific patterns of the pastes are not specifically limited to the order described above. However, it is always preferable to arrange the opposed electrodes and the discharge auxiliary electrode adjacent to each other.

Furthermore, it is preferable for the sealing layer to be disposed between the ceramic constituting the ceramic base material and the electrode.

(6) Stacking, Pressure Bonding

A plurality of second ceramic green sheets with no paste applied thereto were stacked on the non-printing surface of first ceramic green sheet with the respective pastes applied thereto in the order of sealing layer paste, discharge auxiliary electrode paste, and opposed electrode paste in the manner described above, and pressure bonding was performed to form a laminated body. It is to be noted that the laminated body was formed so as preferably to have a thickness of about 0.3 mm after firing in this case.

(7) Firing, Formation of External Electrode

The laminated body obtained was cut into a predetermined size, and then subjected to firing preferably under the condition of the maximum temperature of about 980° C. to about 1000° C., for example, in a firing furnace with an atmosphere controlled by using $N_2/H_2/H_2O$. Then, an external electrode paste was applied onto both ends of the fired chip, and further subjected to firing in a firing furnace with a controlled atmosphere, thereby providing an ESD protection device with the structure as shown in FIGS. 1 and 2.

Further, for the purpose of characteristic evaluation, the sealing layer pastes P1 to P10 shown in Table 4 were used as the sealing layer paste to prepare ESD protection devices (samples of sample numbers 1 to 10 in Table 5), each including a sealing layer.

In addition, for comparison, an ESD protection device (a sample of sample number 11 in Table 5) including no sealing layer was prepared.

Although not described in the present preferred embodiment, for the purpose of improving weatherability, a protective film may preferably be formed over the discharge gaps of the ESD protection devices after firing. While the material of the protective film is not particularly limited, examples of the material include, for example, a material composed of an oxide powder, such as alumina or silica, and a thermosetting resin, such as a thermosetting epoxy resin or a thermosetting silicone resin.

TABLE 5

| Sample | Sealing Layer Paste | | | | | | | | | |
|---|---|---|---|---|---|---|---|---|---|---|
| Number | P1 | P2 | P3 | P4 | P5 | P6 | P7 | P8 | P9 | P10 |
| 1 | ○ | — | — | — | — | — | — | — | — | — |
| 2 | — | ○ | — | — | — | — | — | — | — | — |
| 3 | — | — | ○ | — | — | — | — | — | — | — |
| 4 | — | — | — | ○ | — | — | — | — | — | — |
| 5 | — | — | — | — | ○ | — | — | — | — | — |
| 6 | — | — | — | — | — | ○ | — | — | — | — |
| 7 | — | — | — | — | — | — | ○ | — | — | — |
| 8 | — | — | — | — | — | — | — | ○ | — | — |
| 9 | — | — | — | — | — | — | — | — | ○ | — |
| 10 | — | — | — | — | — | — | — | — | — | ○ |
| *11 | | | | | | | | | | |

3*mark: outside the scope of the present invention (without the sealing layer)

Next, the respective ESD protection devices (samples) prepared in the manner described above were examined for their respective characteristics by the following methods.

(1) Thickness of Reactive Layer

The samples were cut along the thickness direction, the cut surfaces were subjected to polishing, the interface between the sealing layer and the ceramic base material was then observed by SEM and WDX to check the thickness of a reactive layer provided at the interface.

(2) Short Circuit Characteristics

Voltages were applied to the respective samples under two types of conditions of about 8 kV×50 shots and about 20 kV×10 shots, and the samples with log IR>6Ω were evaluated as sample with good short circuit characteristics (○), whereas the samples with log IR≤6Ω once during the continuous application of the voltage were evaluated as samples with defective circuit characteristics (×).

(3) Vpeak and Vclamp

In conformity with the IEC standard, IEC 61000-4-2, a peak voltage value, Vpeak, and a voltage value after about 30 ns from the crest value, Vclamp, were measured when a contact discharge of about 8 kV was applied. The voltage application was performed 20 times for each sample.

The samples with Vpeak_max≤900 V were evaluated as samples with good Vpeak (○), and the samples with Vclamp_ max≤100 V were evaluated as samples with good Vclamp (○).

(4) Repetition Characteristics

Loads of short: 8 kV×100 shots and Vclamp: 8 kV×1000 shots were applied, and samples with log IR>6 and Vclamp_ max≤100 V for all of the measurement results were evaluated as samples with good repetition characteristics (○).

(5) Substrate Fracture, Substrate Warpage

The appearances of the fired products were observed visually and the products with their cross sections polished were observed under a microscope, and the samples with no crack were evaluated as good samples (○). In addition, as for substrate warpage, the products were placed on a horizontal plate, and the samples with the center or ends not spaced away from the plate were evaluated as good samples (○).

Table 6 shows the results of evaluating the characteristics as described above.

TABLE 6

| Sample Number | ΔB | Thickness of Reactive Layer (μm) | Short Circuit Characteristics 8 kV | 20 kV | V peak | V clamp | Repetition Characteristics | Substrate Fracture, Substrate Warpage | Comprehensive Evaluation |
|---|---|---|---|---|---|---|---|---|---|
| 1 | 1.33 | 43.6 | ○ | ○ | ○ | ○ | ○ | ○ | ○ |
| 2 | 0.89 | 5.1 | ○ | ○ | ○ | ○ | ○ | ○ | ○ |
| 3 | 0.08 | 1.9 | ○ | ○ | ○ | ○ | ○ | ○ | ○ |
| 4 | −0.09 | 1.6 | ○ | ○ | ○ | ○ | ○ | ○ | ○ |
| 5 | 0.02 | 4.2 | ○ | ○ | ○ | ○ | ○ | ○ | ○ |
| 6 | 0.07 | 2.0 | ○ | ○ | ○ | ○ | ○ | ○ | ○ |
| 7 | 0.15 | 1.6 | ○ | ○ | ○ | ○ | ○ | ○ | ○ |
| 8 | 0.53 | 5.1 | ○ | ○ | ○ | ○ | ○ | ○ | ○ |
| 9 | 0.61 | 6.0 | ○ | ○ | ○ | ○ | ○ | ○ | ○ |
| 10 | 1.05 | 30.8 | ○ | ○ | ○ | ○ | ○ | ○ | ○ |
| *11 | — | — | ○ | X | ○ | ○ | X | ○ | X |

7*mark: outside the scope of the present invention (without the sealing layer)

First, as for the thickness of the reactive layer, as shown in Table 6, it was confirmed that the respective samples of sample numbers 1 to 10 show a correlation between the ΔB value (see Table 1) and the thickness of the reactive layer, and there is a tendency that the thickness of the reactive layer is increased with increase in ΔB value.

Further, for the samples of sample numbers 1 to 10 (that is, the samples with ΔB of about 1.4 or less), it was confirmed that sufficient adhesion is ensured at the interface between the sealing layer and the ceramic defining the ceramic base material, and the samples are usable even when the firing temperature is less than the melting point of the material constituting the sealing layer.

It is to be noted that no reactive layer was confirmed in the sample of sample number 11 in which no sealing layer is provided.

As for short circuit characteristics, it was confirmed that the respective samples of sample numbers 1 to 10 have no short circuit defect caused after applying each of the initial short and the continuous ESD, and have no problems with their short circuit characteristics.

On the other hand, in the case of the sample of sample number 11 which did not include a sealing layer, it was confirmed that the incidence of short circuit is increased as the inserted voltage value is increased, although no short circuit defect was caused in the evaluation at about 8 kV. This is believed to be due to an increase in the inflow of the glass component from the ceramic into the discharge auxiliary electrode, and thus excessive sintering of the discharge auxiliary electrode, because the sample of sample number 11 does not include a sealing layer.

It is to be noted that the excessive sintering of the discharge auxiliary electrode brings the Cu powders closer to each other, and thus, a short circuit defect through fusion of the Cu powders to each other during the ESD application is much more likely.

In addition, it was confirmed that each sample of sample numbers 1 to 11 achieves the required characteristics for Vpeak and Vclamp, and thus, a discharge phenomenon is quickly produced in the protection element during the ESD application.

Furthermore, the following finding has been provided for the repetition characteristics. More specifically, it was confirmed in each sample of sample numbers 1 to 10 that the discharge capacity is maintained favorable even when the frequency of voltage application is increased.

However, in the case of sample number 11 including no sealing layer, short circuits were observed during the continuous application for the short circuit characteristics, while the required characteristics were achieved for Vpeak and Vclamp.

In addition, as for substrate fracture and substrate warpage, as shown in Table 6, it was confirmed that neither substrate fracture nor substrate warpage is caused when ΔB (the difference ΔB between the basicity B1 of the main component of the sealing layer and the basicity B2 of the amorphous portion of the ceramic of the ceramic base material) is about 1.33 or less, in each case of the sealing layer using the material including some of the elements of the ceramic substrate, and the sealing layer using the other materials shown in Table 1. Further, it was confirmed from behaviors of other samples, not shown in Table 6, regarding substrate fracture and substrate warpage, that favorable sealing layers can be formed without problems, such as structural disorder as long as ΔB is about 1.4 or less.

Thus, it was confirmed that according to preferred embodiments of the present invention, ESD protection devices are provided which produce specific effects including the following:

(a) the sealing layer disposed between the discharge auxiliary electrode and the ceramic base material traps the glass component and prevents an ingress from the ceramic base material into the discharge auxiliary electrode, thereby preventing short circuit defects from being caused by excessive sintering of the discharge auxiliary electrode;

(b) the reactive layer including a reaction product produced by the reaction between the component material of the sealing layer and the component material of the ceramic base material is provided at the interface between the sealing layer and the ceramic base material, thereby ensuring the adhesion between the sealing layer and the ceramic base material, and thus improving the reliability; and (c) the ESD protection device is designed so as to provide a difference ΔB (=B1−B2) of about 1.4 or less between the basicity B1 of the main component material of the sealing layer and the basicity B2 of the amorphous portion of the ceramic base material, thereby preventing an excessive reaction between the sealing layer and the ceramic base material, and as a result, preventing excessive sintering of the discharge auxiliary electrode.

In addition, ESD protection devices according to preferred embodiments of the present invention have stable characteristics, which are much less likely to be degraded, even if the static electricity is applied repeatedly. Thus, it is possible to use the ESD protection devices for the protection of various appliances and devices including semiconductor devices.

It is to be noted that the present invention is not limited to the preferred embodiments described above, and it is possible to make various modifications to the component material of, specific shapes of, and methods of forming the sealing layer, opposed electrodes, and discharge auxiliary electrode, the composition of the glass-containing ceramic of the ceramic base material, and other aspects of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ESD protection device comprising:

a ceramic base material including a glass component;

a first opposed electrode on one side of the ceramic base material and a second opposed electrode on another side of the ceramic base material, the first and second opposed electrodes being arranged so as to be opposed to each other and be spaced apart from each other with a distance therebetween on a surface of the ceramic base material; and a discharge auxiliary electrode connected to each of the first and second opposed electrodes, the discharge auxiliary electrode being arranged so as to provide a bridge from the first opposed electrode to the second opposed electrode; wherein a sealing layer to prevent ingress of the glass component from the ceramic base material into the discharge auxiliary electrode is provided between the discharge auxiliary electrode and the ceramic base material;

the first and second opposed electrodes, the discharge auxiliary electrode, and the sealing layer are disposed on an outer surface of the ceramic base material; and a reactive layer including a reaction product produced by a reaction between a component material of the sealing layer and a component material of the ceramic base material is provided at an interface between the sealing layer and the ceramic base material.

2. The ESD protection device according to claim 1, wherein the sealing layer includes some of components included in the ceramic base material.

3. The ESD protection device according to claim 1, wherein the sealing layer includes an aluminum oxide as its main component.

4. The ESD protection device according to claim 1, wherein the discharge auxiliary electrode includes a metallic particle and a ceramic component.

5. An ESD protection device comprising:

a ceramic base material including a glass component;

a first opposed electrode on one side of the ceramic base material and a second opposed electrode on another side of the ceramic base material, the first and second opposed electrodes being arranged so as to be opposed to each other and be spaced apart from each other with a distance therebetween on a surface of the ceramic base material; and a discharge auxiliary electrode connected to each of the first and second opposed electrodes, the discharge auxiliary electrode being arranged so as to provide a bridge from the first opposed electrode to the second opposed electrode; wherein a sealing layer to prevent ingress of the glass component from the ceramic base material into the discharge auxiliary electrode is provided between the discharge auxiliary electrode and the ceramic base material;

the first and second opposed electrodes, the discharge auxiliary electrode, and the sealing layer are disposed on an outer surface of the ceramic base material; and a difference $\Delta B$ (=B1−B2) is about 1.4 or less between a basicity B1 of a main component material of the sealing layer and a basicity B2 of an amorphous portion component of the ceramic base material.

6. The ESD protection device according to claim 5, wherein a reactive layer including a reaction product produced by a reaction between a component material of the sealing layer and a component material of the ceramic base material is provided at an interface between the sealing layer and the ceramic base material.

7. The ESD protection device according to claim 5, wherein the sealing layer includes some of components included in the ceramic base material.

8. The ESD protection device according to claim 5, wherein the sealing layer includes an aluminum oxide as its main component.

9. The ESD protection device according to claim 5, wherein the discharge auxiliary electrode includes a metallic particle and a ceramic component.

10. A method for manufacturing an ESD protection device comprising the steps of:

printing a sealing layer paste on one principal surface of a first ceramic green sheet, thereby forming an unfired sealing layer;

printing a discharge auxiliary electrode paste to coat at least a portion of the sealing layer, thereby forming an unfired discharge auxiliary electrode;

printing an opposed electrode paste on one principal surface of the first ceramic green sheet, thereby forming an unfired first opposed electrode on one side of the first ceramic green sheet and a second opposed electrode on another side of the first ceramic green sheet, each of the first and second opposed electrodes partially covering the discharge auxiliary electrode, and the first and second opposed electrodes being spaced apart from one another at a distance therebetween;

stacking a second ceramic green sheet on another principal surface of the first ceramic green sheet, thereby forming an unfired laminated body; and firing the laminated body; wherein during the step of firing the laminated body, a reactive layer including a reaction product produced by a reaction between a component material of the sealing layer paste and a component material of the first ceramic green sheet is produced at an interface between the sealing layer paste and the first ceramic green sheet.

* * * * *